April 30, 1929.  L. T. WOOD  1,711,299
LOCKING MECHANISM FOR DUMPING BODIES
Filed March 14, 1927   3 Sheets-Sheet 1
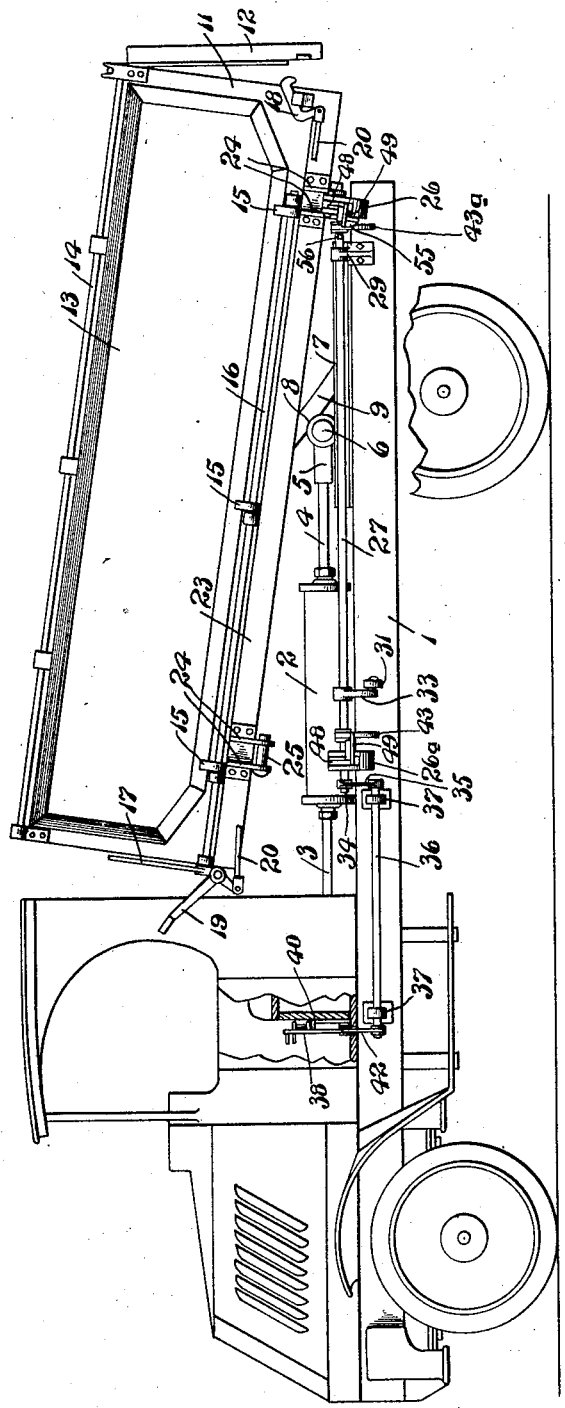
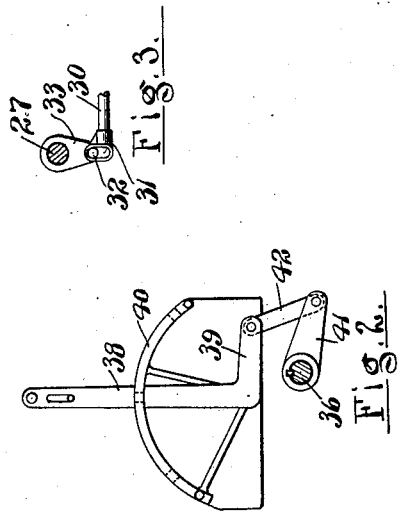
Inventor
Logan T. Wood
By Frank E. Liverance, Jr.
Attorney.

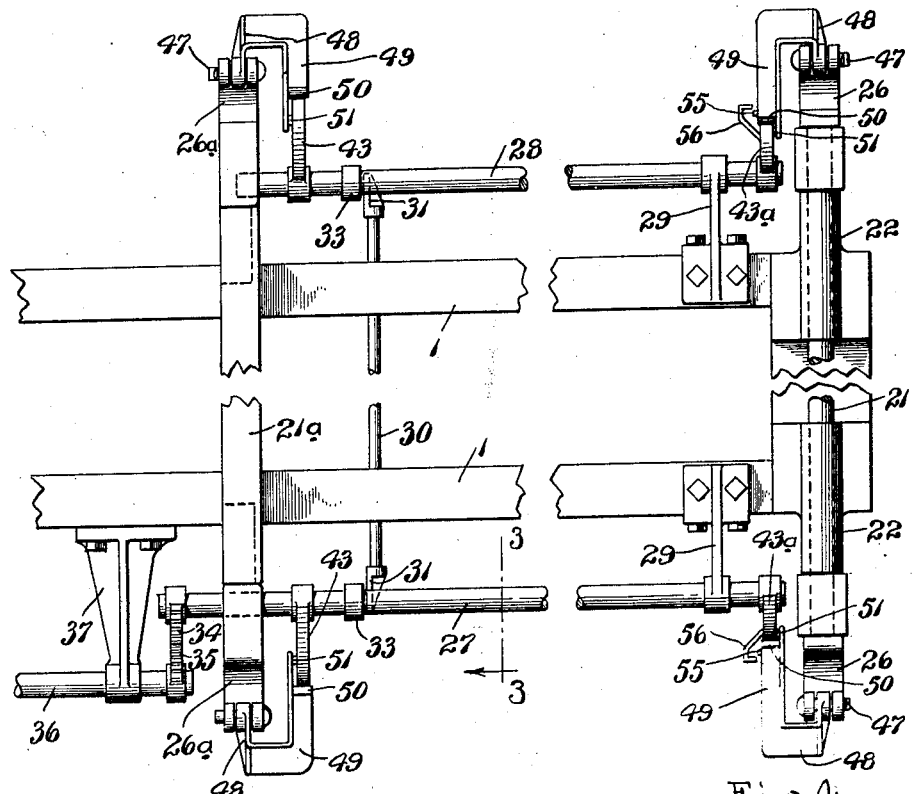
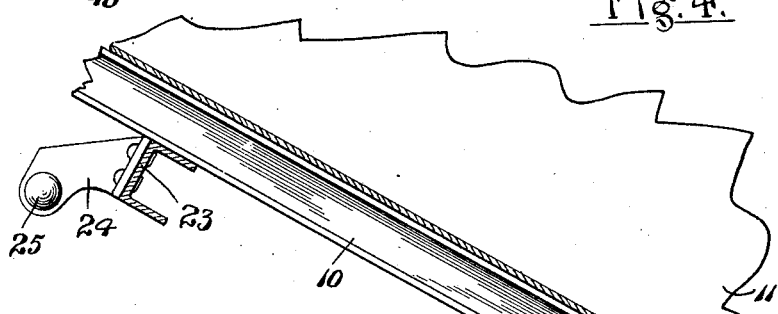
Fig. 4.
Fig. 5.
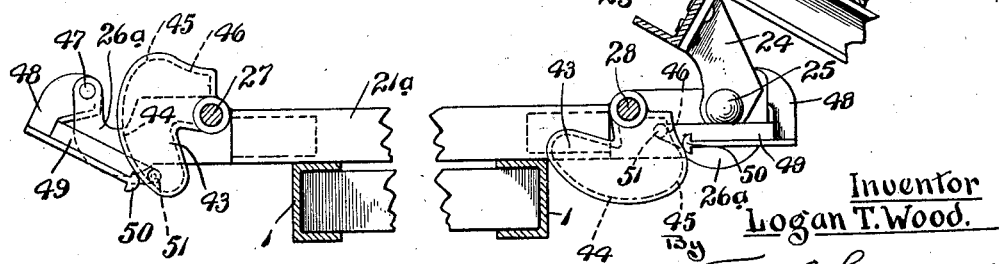
Inventor
Logan T. Wood.
By Frank E. Liverance, Jr.
Attorney.

April 30, 1929.　　　L. T. WOOD　　　1,711,299
LOCKING MECHANISM FOR DUMPING BODIES
Filed March 14, 1927　　3 Sheets-Sheet 3

Inventor
Logan T. Wood
By Frank E. Liverance, Jr
Attorney.

Patented Apr. 30, 1929.

1,711,299

UNITED STATES PATENT OFFICE.

LOGAN T. WOOD, OF DETROIT, MICHIGAN.

LOCKING MECHANISM FOR DUMPING BODIES.

Application filed March 14, 1927, Serial No. 175,118, and in France November 2, 1926.

This invention relates to a locking mechanism for dumping bodies which are mounted on trucks for tilting in three directions, one to the rear about a horizontal axis located transversely of the vehicle, and the others to either side of the body about horizontal axes mounted parallel with the length of the truck. The present construction is a modification of and improvement upon my construction of body dumping mechanism filed of even date herewith and is directed to a simplification of the control mechanism for selecting which way the body shall be dumped with its contents.

In the present construction the body is carried on two pairs of bearings, one pair at each side of the truck. The front bearings of each pair of bearings are normally unlocked so that the body may be tilted upwardly at its front end about a rear transverse horizontal axis. If, however, it is desired to tilt the body to either side a single manually controlled device is used which when moved to one side unlocks the bearings at one side of the body and locks the bearings at the opposite side so that the body may be tilted about a horizontal axis parallel to the length of the vehicle which is coincident with the axes of the bearings which are locked in place. Moving said device to the opposite side correspondingly locks and unlocks certain of said bearings so that the body may be tilted in the opposite direction and dump its contents at the opposite side of the vehicle. With the manual control device at a neutral position the body is locked with respect to the rear bearings and unlocked at the front for the rear dumping movement of the truck body.

It is an object and purpose of the present invention to provide simple and effective mechanism for attainment of the above described ends as well as many others not at this time stated, all of which will appear fully and in detail as understanding of the invention is had from the following description taken in connection with the accompanying drawings, in which, Fig. 1 is a side elevation of a truck with dumping body applied thereto and equipped with my invention.

Fig. 2 is a front elevation of the control lever which controls the locking and unlocking of the bearings.

Fig. 3 is a vertical section of a detail of construction, said section being taken substantially on the plane of line 3—3 of Fig. 4.

Fig. 4 is a fragmentary plan view showing the rear part of the truck frame equipped with my invention and with the body removed.

Fig. 5 is a fragmentary transverse vertical section illustrating the position of the body when the same is tilted to one side.

Like reference characters refer to like parts in the different figures of the drawings.

Figure 6:
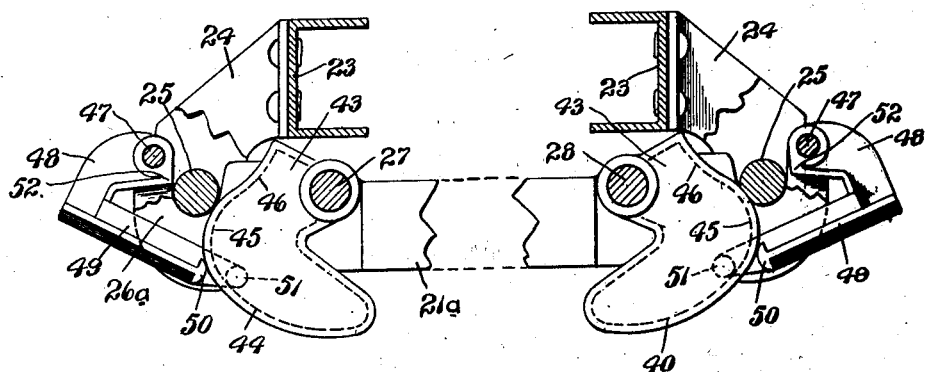
Fig. 6 is a fragmentary enlarged vertical section through the mechanism of the invention showing the front locking devices in normal position wherein the front bearings of the body are unlocked.

The truck is of any conventional construction having a chassis frame with spaced apart side frame members 1 connected by the usual cross members. On the truck frame a cylinder 2 is mounted which has oil pumped into it through the pipe 3 in order to force a piston therein and the piston rod 4 connected thereto to the rear. The return pipe for the oil and the by-pass construction are not illustrated in this application, the same being fully shown and described in the application to which reference has been previously made. It is enough to say that the rear end of the piston rod carries a cross head 5 equipped with rollers 6 at its ends which traverse tracks 7 carried by the truck frame and that the cross head also has other rollers 8 which bear against lifting cams 9 attached to the under side of the body or to the rear transverse horizontal rod about which it tilts upwardly, and that this construction is also equipped with a transverse cam beam identical with that shown in the previously mentioned application for patent, so that the rearward movement of the piston and the connected cross head serves to tilt the body and dump its contents to the rear in one position of the locking device for the side bearings which will hereafter be described, or the body may be tilted to either side upon locking some and unlocking others of said bearings.

On a plurality of cross sills 10 (see Fig. 5) the dumping body 11, is secured. This body has a rear tail gate 12 of usual construction pivotally mounted to swing to the rear about a horizontal rod at its upper end. It also, at each side, has a pivotally mounted side door 13 each of which may swing outwardly at its lower part, the axis of swing being an upper horizontal rod 14 on which each of the side doors 13 is mounted. The sides 13 are retained at inner closing position by latch fingers 15, a number of which are secured to a horizontal rock shaft 16, one at each side of the truck body, and each of which may be rocked so as to release or secure a side door 13 by means of an operating handle 17 fixed to the front end of each rod 16. The tail gate 12 may also be latched in place by a latch 18 which is operated by a lever 19 mounted at the front of the body and connected to the latch by a connecting rod 20.

At the rear end of the truck frame and transverse of the same a horizontal shaft 21 is mounted for turning, being secured to and rotatably mounted on the frame by the bearings 22 (see Fig. 4). The cross sills 10 at the under side of the body are connected to two spaced apart channel bars 23 lying above and parallel to the chassis side frame members 1. Adjacent the front and rear ends of each of the channels 23 a pair of brackets 24 are secured and extend downwardly and outwardly. Between each pair of brackets a bearing pin 25 is mounted. The pins 25 at the rear of the body are received in shallow U-shaped sockets 26 which, for convenience, are made at the ends of the rod or shaft 21. The front pins 25 are received in similar sockets 26ª made in members connected to the opposite ends of a cross bar 21ª which lies above and is secured to the chassis frame members 1 (see Fig. 4). The body of the truck, accordingly, is supported adjacent its four corners. It is evident that the pins 25 at a side of the truck are in alignment and that the body may be tilted to either side by turning about the axis of the pins 25 at a side of the vehicle. It is also evident that when the body is tilted upwardly at its front end the shaft 21 will turn by reason of the engagement of the rear pins 25 with the rear sockets 26.

Two shafts 27 and 28 are located at opposite sides of the truck frame being mounted at their rear ends in bearings in brackets 29 attached to the side members 1 of the frame and at their front ends being mounted on the cross bar 21ª. The shafts 27 and 28 are connected by a cross rod 30 which passes through the webs of the chassis frame members 1 and at each end is equipped with a head 31 having a short vertical slot therein. The slots receive pins 32 projecting from the lower ends of arms 33 which in turn are fixed one to each of the shafts 27 and 28. Rocking the shaft 27 accordingly in one direction through this connection causes a similar rocking of the shaft 27.

At the front end of the shaft 27 a gear segment 34 is secured, meshing with which is a second gear segment 35 of like pitch which is secured at the rear end of a third shaft 36 lying alongside of and mounted for rocking movements in bearings at the end of brackets 37 carried by and extending from the frame member 1, as shown in Figs. 1 and 4. A bell crank lever 38 having an arm 39 at its lower end extending at right angles to the other or vertical arm of the lever is pivotally mounted on a casting 40 secured above and at the front end of the shaft 36. An arm 41 extends from the shaft 36 and its end of the arm 39 are connected by a link 42. The casting 40 is arc-shaped at its upper side and lever 38 is movable to three different positions over the arc and equipped with the usual releasable latch means for holding it in any one of the three positions that it may take. At the intermediate or vertical position, shown in Fig. 2, the lever 38 is vertical and this is what may be termed the neutral or normal position of the lever. The other positions are at either side of the neutral or normal position and it is evident that when the bell crank lever is moved to one or the other of said positions shaft 36 is turned and simultaneously shafts 27 and 28 are rocked about their axes equal amounts.

Adjacent the front end of each of shafts 27 and 28 an irregularly shaped cam member 43 is fixed having the form best shown in Figs. 5 and 6, and having a continuous flange or lip 44 extending forwardly around its edges. The shape of the members 43 is such that the lip is curved on the arc of a circle, as indicated at 44, for a considerable distance concentric with the shaft 27 or 28. This at one end joins with a second curved portion 45 struck on a much shorter radius and is then reversely curved as indicated at 46.

At the upper end on the outer leg of each of the U-shaped sockets 26 and 26ª a latching member is pivotally mounted at 47 and is formed with a downwardly and outwardly extending arm 48 bent laterally at its lower end and then extended forwardly, as indicated at 49, which at its front end is equipped with a head 50 to bear against the outer side of the flange 44. The arm 49 is of angle form, the head 50 being at the front end of the horizontal leg while the vertical leg is extended farther forward and carries a roller 51 which bears against the inner side of the flange 44. Turning the members 43 accordingly varies the position of the latching members associated with them. In the normal position of the shafts 27 and 28, that is, with the operating bell crank lever shown in Fig. 2 at central neutral position the cam members 43 and the latches are as shown in Fig. 6. By rocking the shaft 27 in one direction to the position shown in Fig. 5 shaft 28 being rocked in the same direction carries its cam member 43 to the position shown in Fig. 5 so that the roller 51 rides against the curved surface 46 and moves the inner corner 52 of the part 48 partly over the pin 25 locking it in its socket. But the pin 25 at the opposite side of the truck is not locked as the roller 51 merely traverses the curved surface 44 and the latching member is not changed in position.

Figure 7:
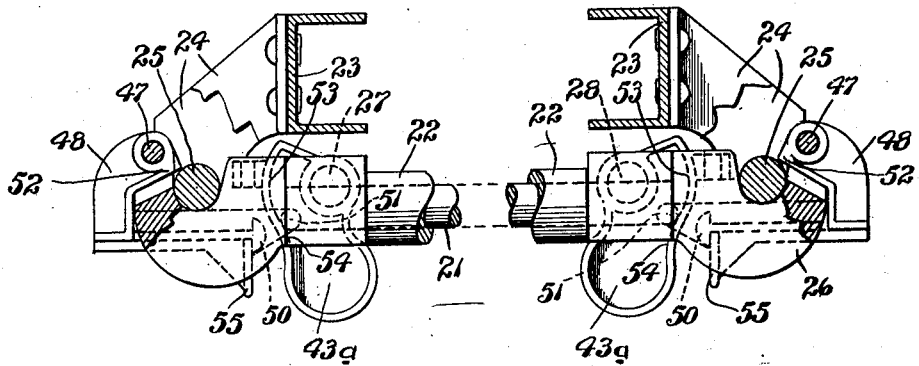
Fig. 7 is a similar view illustrating the normal position of the locking devices for the rear bearings and showing the same locked.

Adjacent the rear end of the shafts 27 and 28 two cam members 43ª of somewhat different form than the members 43 are secured. Each of these cam members is of the shape shown in Fig. 7 and is likewise provided with a surrounding rearwardly projecting flange against the outer side of which the heads 50 of the latching members bear while the rollers 51 of the latching members bear against their inner sides. The flanges of the cam members 43ª include a portion 53 curved about the centers of the shafts 27 and 28, joining with a reversely curved portion 54. When the shafts 27 and 28 are at neutral position the rollers 51 ride on the reversely curved parts 54 and move the latching members so that the corners 52 lie over the pins 25 and lock them in their sockets as shown in Fig. 7. Turning shaft 27 in a clockwise direction, the same as it has been moved in Fig. 5, serves to carry the latching member to disengage from the pin 25, while at the same time the turning of the cam member 43ª on the shaft 28 in a clockwise direction merely causes the roller 51 to bear against the curved surface 53 which is concentric with shaft 27 holding the opposite pin 25 locked.

Both pins 25 at the front are normally unlocked in their sockets 26ª, and with the rearward movement of the cross head 10, the body may be tilted upwardly as shown in Fig. 1 with shaft 21 turning in its bearings 22, and with both of the rear pins 25 locked in their sockets 26 as indicated in Fig. 7. Operating the control lever 38 to one side rocks the shafts 27 and 28, unlocking the pin 25 at the rear at one side of the body and locking the pin 25 at the front at the opposite side of the body in their respective sockets. If the control lever 36 is moved the opposite way from central neutral position the opposite front pin 25 is locked in its socket and the opposite rear pin on the other side of the truck is unlocked. Whichever way the control lever 38 is moved from normal central neutral position, two of the pins 25 those on the same side of the body are locked in their sockets 26 and 26ª while the other pins 25 on the opposite side are free in their sockets 26 and 26ª. Then when the cross head 5 moves to the rear the body tilts about the axis of the pins 25 which remain locked in their sockets, while the unlocked pins are elevated out of their sockets, as shown in Fig. 5. The body may be tilted to either side depending which pair of pins at a side of the body are freed or locked in place.

Figure 8:
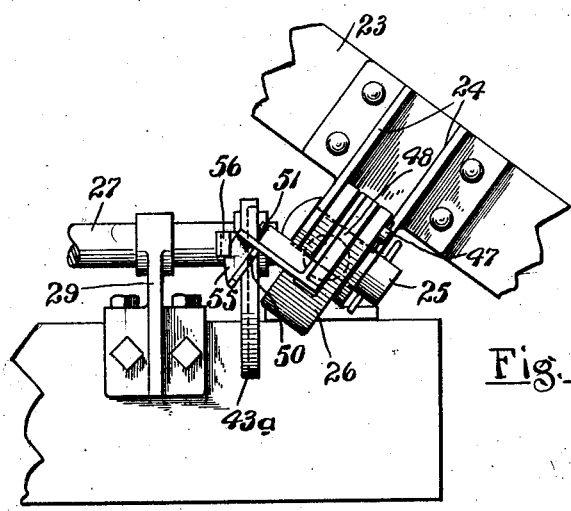
Fig. 8 is a fragmentary enlarged side elevation at the rear part of the vehicle showing the manner in which the rear bearings are maintained in locked position on tilting of the truck body for rear dumping.

When the body is tilted for rear dumping of its contents without the provision of other means to insure that the pins 25 remain locked in the rear sockets 26, the same might become unlocked when the rollers 51 move out of engagement with the flanges on the members 43ª. As shown in Fig. 8, with the continued upwardly tilting of the body about the axis of the shaft 21, the rollers 51 are moved upwardly and to the rear and disengage from the members 43ª. Accordingly, the latches at the rear end, particularly the horizontal arms 49 thereof, are equipped with laterally extending wings 55 (see Fig. 8) which, as the body is tilted more and more, come underneath retaining devices 56 fastened to and extending from the cam members 43ª thereby holding the latching members in place over the rear pins 25.

This construction makes it possible for the operator of the truck to use one control lever alone, namely, the lever 38, to select which of the three dumping operations is to be performed. If the lever is left at central neutral position the truck load is dumped to the rear when the hydraulic tilting apparatus is put to work. If the lever 38 is moved to one side then the contents of the body will be dumped at one side of the truck while if it is moved to the opposite side the contents of the body will be dumped at the opposite side of the truck. Of course, whenever a selection has been made a proper operation of either one or the other of the latch release levers 17 must be performed, if there is to be a side dumping of the contents, or the lever or handle 19 must be operated to release the latch 18, if it is to be a rear dumping of such contents.

This construction is practical, durable, simple in operation and does not get out of order under the severe usage to which an apparatus of this character is put in service. The invention is defined in the appended claims and is to be considered comprehensive of all forms of structure coming within their scope.

I claim:

1. In combination, a truck frame, a body mounted above the truck frame, bearing pins mounted on said body, one adjacent each corner thereof, sockets carried by said frame in which the bearing pins seat, a horizontal shaft mounted on the frame transversely thereof and adjacent its rear end for rotary movement, the rear sockets being fixed to the ends of said shaft and carried by the same in the rotary movement thereof, means for normally locking the rear bearing pins in said rear sockets with the front bearing pins free in their sockets, and a single manually operable means for unlocking one of the rear bearing pins at their end of the shaft, and simultaneously locking the bearing pin in the front socket at the opposite side of the frame.

2. In combination, a truck frame, a body located above the frame, bearing pins secured to the body one adjacent each corner, a horizontal shaft located adjacent the rear end and transversely of the frame for rotary movement, a socket fixed to each end of the shaft and carried by the same in the rotary movement thereof, said sockets receiving the rear bearing pins on the body, two other sockets at opposite sides thereof carried by said frame in which the front bearing pins are seated, a latch connected to each socket to lock its associated pin in its socket, operating means associated with said latches including a single manually operable lever movable to three positions, in one of which the front bearing pins are free in their sockets and the rear bearing pins are locked, in another of which the bearing pins at one side of the body are locked in their sockets and those at the opposite side are unlocked, and in the third of which the pins at said opposite side of the body are locked in their sockets and those at the other side unlocked, and a single hydraulic means for tilting the body in accordance with any of the three arrangements of said latches.

3. In combination, a truck frame, a shaft rotatably mounted transversely and at the rear end of said frame for rotary movement, a socket fixed to each end of the shaft and carried by the same in the rotary movement thereof, other sockets carried by the frame at each side thereof in front of the rear sockets, a body, bearing pins one adjacent each corner of said body seating in said sockets, a latch carried by each socket for locking the bearing pins therein or freeing them with respect to said sockets, a rock shaft rotatably mounted carried by and parallel to each side of the frame, means connecting the rock shafts whereby when one is rocked the other is rocked simultaneously in the same direction, cam members on said shafts associated with the latches for moving them to locked or unlocked position, and manually operable means for turning one of said shafts and its connected shaft to three positions, one in neutral position wherein the front bearing pins are unlocked and the rear bearing pins are locked in their sockets, in another of which the bearing pins at one side of the body are locked in their sockets and the opposite bearing pins unlocked, and in the third of which the bearing pins at said opposite side of the body are locked in their sockets and those at the other side unlocked.

4. A construction containing the elements in combination defined in claim 3, said means for rocking one of said shafts, comprising a third horizontal shaft mounted at the same side of the truck frame and extending substantially to the driver's seat of the truck, gearing between the third shaft and the shaft rocked and an operating lever accessible to the driver of the truck connected with said third shaft and movable to and adapted to be held in any one of three positions.

5. In combination, a truck frame, a horizontal shaft mounted transversely and at the rear end of said frame for rotary movement, said shaft having sockets, one at each end of the shaft fixed thereto and carried by the said shaft in the rotary movement thereof, other sockets carried by the frame, one at each side thereof in front of said first sockets, a truck body, bearing pins thereon one adjacent each corner of the body seated in said sockets, a latch mounted on each socket for locking each pin in its socket, a mechanism operable by a single manually controlled lever connected with the latches for locking the rear bearing pins in their sockets and freeing the front bearing pins when in one position, or locking the pins at one side of the body in their sockets with those of the opposite side unlocked in two other different positions, whereby the body may be tilted about a selected one of three axes, means for maintaining the latches in locked engagement with the rear bearing pins when the body is tilted about said shaft, and a single hydraulic tilting mechanism for turning the body about any one of the three axes of tilting selected.

6. In combination, a truck frame, a body located above the truck frame, a transverse shaft journaled on the truck frame at the rear end thereof for rotary movement, front and rear sockets, the front sockets being rigidly secured to the truck frame, and the rear sockets being fixed to the transverse shaft and carried by the same in the rotary movement thereof, bearing pins attached to the body and seated in the sockets, latches pivotally mounted in the sockets and arranged to project over the same to confine the bearing pins therein, longitudinal rock shafts mounted on the truck frame at opposite sides thereof and provided with cam members connected with and adapted to actuate the latches to locking the bearing pins in the sockets and to release the same, means for connecting the rock shafts for causing simultaneous operation of the same and the cam members, and manually operable means connected with one of the rock shafts for actuating the same.

In testimony whereof I affix my signature.

LOGAN T. WOOD.